United States Patent [19] … [11] Patent Number: 4,829,105
Yamada et al. … [45] Date of Patent: May 9, 1989

[54] ELECTRODEPOSITION COATING COMPOSITION CONTAINING MODIFIED EPOXY RESIN HAVING CHARGEABLE GROUPS

[75] Inventors: Mitsuo Yamada, Suita; Kazunori Kanda, Yao; Shinsuke Shirakawa, Suita; Hirotoshi Umemoto, Uji; Ryuzo Mizuguchi, Yawata, all of Japan

[73] Assignee: Nippon Paint Co., Ltd., Osaka, Japan

[21] Appl. No.: 149,299

[22] Filed: Jan. 28, 1988

[30] Foreign Application Priority Data

Jan. 30, 1988 [JP] Japan ................................. 62-021550
Jan. 30, 1988 [JP] Japan ................................. 62-021551

[51] Int. Cl.$^4$ ..................... C08G 59/14; C09D 5/44; C08L 63/00
[52] U.S. Cl. .................................... 523/415; 523/414; 523/416; 525/523; 525/528; 525/533; 528/45; 528/73; 528/103; 528/108; 528/109; 528/112; 528/116; 528/354; 528/361; 528/365
[58] Field of Search ........................ 525/523, 528, 533; 528/45, 73, 103, 108, 109, 112, 116, 354, 361, 365; 523/414, 415, 416

[56] References Cited

U.S. PATENT DOCUMENTS

| 4,086,294 | 4/1978 | Koleske et al. ................. 528/354 X |
| 4,384,104 | 5/1983 | Dexheimer .......................... 528/103 |
| 4,554,332 | 11/1985 | Kordomenos et al. ......... 525/533 X |
| 4,579,917 | 4/1986 | Kordomenos et al. ............. 525/533 |
| 4,581,424 | 4/1986 | Kordomenos et al. ............. 525/533 |
| 4,659,800 | 4/1987 | Daimer et al. ..................... 528/103 |
| 4,698,398 | 10/1987 | Kordomenos et al. ......... 525/533 X |
| 4,698,399 | 10/1987 | Kordomenos et al. ......... 525/533 X |
| 4,698,400 | 10/1987 | Kordomenos et al. ......... 525/533 X |
| 4,708,995 | 11/1987 | Kordomenos et al. ......... 525/533 X |
| 4,714,744 | 12/1987 | Kordomenos et al. ......... 525/533 X |
| 4,714,745 | 12/1987 | Kordomenos et al. ......... 525/533 X |

Primary Examiner—Earl Nielsen
Attorney, Agent, or Firm—Millen & White

[57] ABSTRACT

An anodic electrodeposition composition containing a water-soluble or water-dispersible modified epoxy resin derived from an epoxy resin having two epoxide groups and at least one alcoholic hydroxy group at the terminals and the middle of the resin backbone, respectively. The modified epoxy resin has at least one polymeric side chain block bound to said alcoholic hydroxy group and at least one acid group derived from said terminal epoxide group.

9 Claims, No Drawings

ELECTRODEPOSITION COATING COMPOSITION CONTAINING MODIFIED EPOXY RESIN HAVING CHARGEABLE GROUPS

BACKGROUND OF THE INVENTION

This invention relates to electrodeposition coating compositions containing a water-soluble or water-dispersible modified epoxy resin as an electrically depositable film-forming component thereof.

Electrically depositable, film-forming resins used in anodic electrodeposition coating compositions generally have a number of hydrophilic groups such as carboxylic group for rendering the resins negatively chargeable and water-soluble or water-dispersible. A relatively large number of such hydrophilic groups must be introduced to the resin molecule for imparting a desired level of water-solubility or water-dispersibility. This, in turn, requires the use of a large amount of base for neutrallizing acid groups possessed by the resin. Also, the resins tend to be liable to hydrolysis and thus are unstable upon storage. The introduction of a large number of hydrophilic groups results in a decreased Coulomb efficiency and throwing power during the electrodeposition coating process while consuming a large quantity of electric energy.

Typical examples of resins used in the anodic electrodeposition coating process include maleinized drying oils, maleinized liquid polybutadiene, acrylic polymers having acid groups and the like. These resins themselves are not satisfactory in their film properties such as corrosion resistance or adhesion strength to substrates. In order to overcome these defects, water-insoluble thermosetting resins such as epoxy acrylate resins are often incorporated to anodic coating compositions as an aqueous emulsion. Since the base resins themselves do not function as a surfactant, they must be emulsified by means of a separate emulsifier which may adversely affect the film properties such as water resistance.

Epoxy resins are known to have many advantageous characteristics such as good adhesion to metal substrates, high corrosion and chemical resistance, high electrical insulating property and the like. For this reason their use is ever increasing in a wide variety of fields. Generally, epoxy resins are used as such or as a solution in an organic solvent. It is often difficult to obtain an optimal balance between their hardness and other properties when used in coating compositions. Water-based epoxy coating compositions may be produced either by emulsifying water-insoluble resins or by introducing hydrophilic moieties into the resin backbone to make them water-soluble or water-dispersible. The resulting coating compositions, however, must suffer from the above described disadvantages such as decrease in water-resistance, storage stability and other properties.

It is known in the prior art to produce a modified epoxy resin having a plurality of flexible side chains by graft polymerizing $\epsilon$-caprolactone to alcoholic hydroxy groups in the middle of an epoxy resin molecule. The resin also has a plurality of primary alcoholic hydroxy groups at the terminal of each side chain. See, Japanese Laid Open (Kokai) Patent Application Nos. 164116/1982, 187463/1983 and 44915/1986. However, resins of this type do not possess any chargeable group required for electrically depositable resins.

SUMMARY OF THE INVENTION

It is therefore a principal object of the present invention to provide an anodic electrodeposition coating composition containing a modified epoxy resin having at least one flexible polymer segment attached to an alcoholic hydroxy group present in the middle of the resin backbone and also an anionic hydrophilic group attached to at least one terminal of the resin backbone.

Other objects and advantages of the present invention will become apparent to those skilled in the art as the description proceeds.

According to the present invention, these and other objects may be accomplished by providing an anodic electrodeposition coating composition comprising a modified epoxy resin uniformly dissolved or dispersed in an aqueous medium containing a base, said modified epoxy resin being derived from a linear epoxy resin having an epoxy equivalent from 100 to 6,000 and two epoxide groups and at least one alcoholic hydroxy group at the terminals and the middle of the resin backbone, respectively, said modified epoxy resin having at said middle a side chain block of the formula:

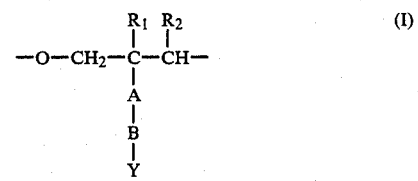

wherein $R_1$ and $R_2$ are independently H or $CH_3$, A is an ether or ester linkage formed from said alcoholic hydroxy group or a bivalent linkage formed by the reaction of a diisocyanate compound with said alcoholic hydroxy group, B is a linear polymer block having a molecular weight from 100 to 7,000, and Y is hydroxy, amino, carboxy or a half blocked diisocyanate compound bound to these active hydrogen-containing groups, and at least one acid group derived from said terminal epoxide group.

The terminal acid group may be a group of the formula:

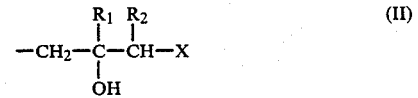

wherein $R_1$ and $R_2$ are as defined, and X is the residue of a polyfunctional carboxylic, sulfonic or phosphoric acid having an active hydrogen-containing group capable of reacting with said epoxide group.

Alternatively, the terminal acid group may be represented by the formula:

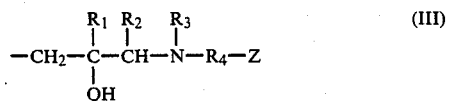

or,

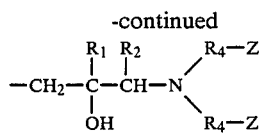

wherein, $R_1$ and $R_2$ are as defined, $R_3$ is H, or unsubstituted or substituted $C_1$-$C_{20}$ alkyl, $R_4$ is unsubstituted or substituted $C_1$-$C_{12}$ alkylene or phenylene, optionally interrupted with a ether or ester linkage, and Z is

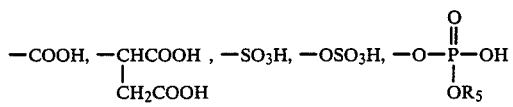

wherein $R_5$ is H, unsubstituted or substituted $C_1$-$C_{12}$ alkyl or phenyl, or partially esterified polybasic organic acid residue.

Furthermore, said terminal acid group may be formed by reacting at least one of said terminal epoxide groups with a compound having at least two active hydrogen-containing groups capable of reacting with said epoxide group and with an isocyanato group, respectively, and then reacting the resulting product with a half blocked diisocyanate compound having a free carboxyl group.

The modified epoxy resins used in the present invention have a plurality of pendant side chain blocks attached to the linear polymer backbone forming a comb-shaped configuration. Accordingly, as will be apparent from the free volume theory, they have a viscosity level substantially lower than the viscosity of linear polymers having a corresponding molecular weight. This permits increased flexibility of polymer design. The resins also have an anionic hydrophilic group at one or both terminals. This gives a good HLB between the terminal acid group and the hydrophobic side chain blocks. Therefore, the resins themselves may function as a surfactant capable of stably dispersing in an aqueous medium or as a dispersant capable of stabilizing aqueous dispersions of water-insoluble thermosetting resins or pigments.

The resin also has at the terminal of each linear side chain a functional group such as hydroxy, amino or carboxy which provides a reaction site with a cross-linking agent such as blocked polyisocyanate compounds or melamine resins. Accordingly, the resin may be cured with a cross-linking agent into a nonfusible and insoluble state after having played its role as an emulsifier or dispersant without compromising the water resistance and other properties of the resulting coating films. The presence of terminal acid groups on the resin backbone not only renders the resin water-soluble but also provides electrical charges required for electrodeposition coating process. Thus, the resin may conveniently be used in producing anodic electrodeposition coating compositions having a high dispersing stability and Coulomb efficiency.

DETAILED DISCUSSION

Starting Epoxy Resin

Any epoxy resin of a linear backbone structure having epoxide groups at both terminals and at least one alcoholic hydroxy group in the middle of the resin backbone may be used. Examples of such epoxy resins include bisphenol epoxy resins such as bisphenol A, bisphenol S or bisphenol F epoxy resins; diglycidyl ethers of glycols such as butanediol, hexanediol or hydrogenated bisphenol A; diglycidyl ethers of a polyoxyalkylene glycols such as polyethylene glycol, polypropylene glycol, polybutylene glycol or adducts of alkylene oxides with bisphenols; diglycidyl esters of dicarboxylic acids such as terephthalic, isophthalic, phthalic or adipic acid; and diglycidyl ethers or esters of hydroxy carboxylic acids such as p-hydroxybenzoic acid or m-hydroxybenzoic acid.

Linear epoxide compounds having no alcoholic group in the middle of their backbone may also be used after chain extending with a bifunctional active hydrogen-containing compound to give a pre-modified epoxy resin having an alcoholic hydroxy group formed by the ring-opening of the epoxide group in the middle of the chain extended polymer. The term "epoxy resins" as used herein is intended to include such chain extended pre-modified epoxy resins. Such chain extenders must have two active hydrogen-containing groups per molecule such as amino, imino, hydroxy or carboxy. Specific examples thereof include alkylene glycols such as ethylene glycol, trimethylene glycol, tetramethylene glycol, or 1,6-hexanediol; polyalkylene glycols such as polyethylene glycol or polypropylene glycol; polyester diols such as hydroxy terminated poly(ethylene glycol adipate); diphenols such as bisphenol A, 1,1-bis(4-hydroxyphenyl)ethane, 2-methyl-1,1-bis(4-hydroxyphenyl) propane, 2,2-bis(4-hydroxy-3-t-butylphenol) propane, bis(2-hydroxynaphthyl)methane or 1,5-dihydroxynaphthalene; dicarboxylic acids and acid anhydrides such as adipic acid, azelaic acid, maleic anhydride or phthalic anhydride; ployester dicarboxylic acids such as carboxy terminated poly(ethylene glycol phthalate); alkanolamines such as N-methylethanolamine, N-methylpropanolamine, diethanolamine or dipropanolamine; and diamines such as N, N'-dimethylethylenediamine or N, N'-dimethyldimethylenetriamine.

The starting epoxy resins must have an epoxy equivalent ranging from 100 to 6,000 to provide the finally modified resins with a suitable HLB level. They also must have at least one alcoholic hydroxy group in the middle of the backbone chain as a reaction site for introducing linear polymer side chains. However, the number of such hydroxy groups is preferably less than 50 per molecule.

Introduction of Side Chain Polymers

Polymer side chains may be introduced to the starting epoxy resin either by directly reacting with a lactone, cyclic ether or lactam or by reacting a diisocyanate and a linear oligomer having an active hydrogen-containing group at each terminal.

Usable lactones may be represented by the formula:

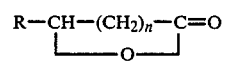

wherein R is H or methyl, and n is 1-4. Specific examples include β-propiolactone, γ-butyrolactone, δ-velerolactone, ε-caprolactone, ε-enatholactone and the like.

Usable cyclic ethers include ethylene oxide, propylene oxide and the like.

Usable lactams include ε-caprolactam, 1-methyl-ε-caprolactam, 3-methyl-ε-caprolactam, 5-ethyl-ε-caprolactam and the like.

The addition polymerization of lactones may be performed at a temperature of about 100° C. to 250° C., preferably from about 120° C. to about 200° C. in the presence or absence of a reaction solvent and a catalyst.

Examples of catalysts include titanium compounds such as tetrabutyl titanate, tetraethyl titanate, tetraisopropoxytitanium, butoxytitanium trichloride or titanium tetrachloride; aluminum compounds such as triethylaluminum, ethylaluminum chloride or aluminum trichloride; zinc compounds such as diethylzinc or zinc chloride, tin compounds such as dibutyltin oxide, dibutyltin laurate or stannous chloride; boron compounds such as boron trifluoride; acids such as p-toluenesulfonic acid or phosphoric acid; alkali metals and their complexes such as lithium, sodium, sodium naphthalene or potassium benzophenone; alkali metal hydroxides such as lithium hydroxide, sodium hydroxide or potassium hydroxide; alkali metal salts such as sodium carbonate or lithium acetate; alkali metal hydrides such as lithium hydride or sodium hydride; and tertiary amines such as triethylamine or pyridine.

The addition polymerization of cyclic ethers and lactams may also be performed using conventional techniques which are well-known in the art.

The polymer side chains may be introduced to the epoxy resin backbone using a diisocyanate compound and a linear oligomer having an active hydrogen-donating group at each terminal.

Usable diisocyanate compounds include 2,4- or 2,5-toluylenediisocyanate, 4,4'-diphenylmethanediisocyanate, xylylenediisocyanate, hexamethylenediisocyanate, isophoronediisocyanate, 1-methylcyclohexane-2, 4-diisocyanate, 1,2-dimethylcyclohexanediisocyanate, dicyclohexylmethane-4, 4'-diisocyanate and the like.

Usable oligomers are linear oligomers terminated with an active hydrogen-donating group such as hydroxy, amino or carboxy and include polyester diols, polyether diols such as polypropylene glycol, polyethylene glycol or polytetramethylene glycol, acrylic polyols, and polycaprolactone.

The reaction may be performed by reacting three components simultaneously or by reacting the diisocyanate first with one of the epoxy resin and the oligomer and then with the remaining component.

The molecular weight of each linear polymer side chain preferably ranges from 100 to 7,000, more preferably from 200 to 3,000. The ratio of the molecular weight of backbone polymer segment to the total molecular weight of side chains preferably ranges 0.1 to 10, more preferably from 0.5 to 8. Within above ranges the final resin products may exhibit well-balanced surface activity and flexibility with a decreased viscosity.

All or part of active hydrogen-donating groups present at the terminal of each side chain may be reacted with a half blocked diisocyanate compound in order to further enhance the surface activity and curability of the resulting product. To this end any one of previously described diisocyanate compounds may be used after blocking one isocyanato group with a suitable blocking agent capable of unblocking upon heating. Examples of usable blocking agents for this purpose include alphatic alcohols such as n-butanol, 2-ethylhexanol or stearyl alcohol; aromatic alcohols such as phenylcarbinol or methylphenylcarbinol; glycol monoethers such as ethylene glycol monomethyl- or monobutyl ether; phenols such as phenol or cresol; oximes such as acetoxime or methylethylketoxime; lactams such as caprolactam; and dialkylaminoalkanols such as 2-dimethylaminoethanol or 2-diethylaminoethanol. The degree of modification of terminal functional groups possessed by the side chain blocks may vary from 20 to 100%, preferably from 30 to 80%. When the degree of modification is lower than the above range, the surface activity and curability of the product will not be enhanced as desired. A modification degree higher than 80% often tends to increase the viscosity of reaction mixture excessively.

Particularly advantageous blocking agents are aliphatic alcohols having more than 3 carbon atoms, aromatic alcohols and phenols. They are capable of giving a desired level of surface activity when the resin is in aqueous phase but capable of unblocking and cross-linking at a relatively low baking temperature.

The effect of chemical modification of terminal functional groups with the half blocked diisocyanate compound may also be seen in a increased throwing power and Coulomb efficiency due to the decrease of electric resistance of deposited film when the product is used in the electrodeposition coating composition of this invention.

Introduction of Anionic Hydrophilic Group

Another structural feature of the resins used herein is the fact that they have an anionic hydrophilic group in place of epoxide group at least one terminal end of the linear resin backbone. Preferably, the anionic hydrophilic group is introduced to both terminal ends. In this case, the resin molecule assumes a unique configuration in which these two hydrophilic groups are spaced by a bulky hydrophobic segment in a comb-like shape as opposed to a linear configuration of many of conventional surfactants. This unique configuration may result in a increased critical micell concentration. Consequently, the resins have a high dispersing stability at varying concentrations and do not excessively increase the viscosity of a system containing the same at relatively higher concentrations.

In order to introduce the anionic hydrophilic group in an efficient manner, it is imperative for the starting epoxy resin to have epoxide group at both terminal ends. Several methods are available for ring opening the epoxide group and introducing the anionic hydrophilic group.

The simplest method comprises reacting the epoxide group with an aqueous solution of alkali metal bisulfite such as sodium bisulfite or potassium bisulfite. In this manner a sulfonate group may be introduced.

Phosphoric acid group may be introduced by reacting the terminal epoxide group with orthophosphoric acid, pyrophosphoric acid, tri- or tetraphosphoric acid. Monalkyl phosphates may also be reacted and include, for example, monomethyl phosphate, monoethyl phosphate, mono-n-propyl phosphate, mono-n-butyl phosphate, monooctyl phosphate, mono-2-ethylhexyl phosphate, monolauryl phosphate and monooleyl phosphate.

Carboxy group may be introduced by reacting the terminal epoxide group with a dicarboxylic acid or its acid anhydride such as oxalic, maleic, fumaric, succinic, azelaic, adipic, phthalic, isophthalic or terephthalic acid and a corresponding acid anhydride if appropriate.

The introduction of anionic hydrophilic group may be effected stepwise by first ring opening the terminal epoxide group with a mono- or dihydroxy monocarboxylic acid such as glycolic, lactic, hydroxypivalic or dimethylolpropionic acid, and then acylating the remaining hydroxy group with a polybasic carboxylic acid anhydride.

A further method for introducing anionic hydrophilic group comprises reacting the terminal epoxide group with a water-soluble salt of a aminocarboxylic acid, aminosulfonic acid or aminophosphoric acid.

Aminocarboxylic acid usable for this purpose may be represented by the formula: $R_3-NH-R_4-COOH$, wherein $R_3$ is H or unsubstituted or substituted $C_1-C_{20}$ alkyl and $R_4$ is unsubstituted or substituted $C_1-C_{12}$ alkylene which may be interrupted with ether or ester linkage or unsubstituted or substituted phenylene.

Specific examples of the above aminocarboxylic acids include glycine, N-butylglycine, N-hexylglycine, N-heptylglycine, N-dodecylglycine, N-octadecylglycine, N-oleylglycine, alanine, N-methylalanine, N-butylalanine, N-hexylalanine, N-heptylalanine, N-dodecylalanine, N-octadecylalanine, N-oleylalanine, β-alanine, N-methyl-β-alanine, N-butyl-β-alanine, ε-aminocapronic acid, threonine, cysteine and methionine.

Aminosulfonic acids of the formula: $R_3-NH-R_4-SO_3H$, wherein $R_3$ and $R_4$ are as defined, may be used for the same purpose and include, for example, taurine, 2-aminopropane-2-sulfonic acid, 2-amino-1,1-dimethylethane-sulfonic acid, 3-aminopentane-2-sulfonic acid, 4-amino-2-methylpentane-2-sulfonic acid, 3-aminopropanesulfonic acid, 4-aminobutane-2-sulfonic acid, 4-aminobutanesulfonic acid, 5-aminopentanesulfonic acid, N-methyltaurine, N-ethyltaurine, N-isopropyltaurine, N-butyltaurine, N-heptyltaurine, N-(2-octadecylsulfinylethyl) taurine, N-(2-stearoyloxyethyl) taurine, 2-methylaminopropanesulfonic acid, 2-dodecylaminopropanesulfonic acid, 2-octadecylaminopropanesulfonic acid, 1-methylamino-2-methylpropane-2-sulfonic acid and 3-methylaminopropanesulfonic acid.

Aminophosphoric acids of the formula:

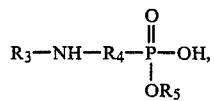

wherein $R_3$ and $R_4$ are as defined, and $R_5$ is unsubstituted or substituted $C_1-C_6$ alkyl or phenyl, may be used for the same purpose and include, for example, aminomethylenephosphonic acid, aminoethylenephosphonic acid and Michael's adducts of amines with vinyl phosphate.

The above amino acids are used in the form of a water-soluble alkali metal, ammonium or amine salt.

The terminal epoxide group of the formula:

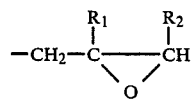

is converted, by the reaction with the above amino acid followed by treating with an acid, into one of the following amphoionic groups:

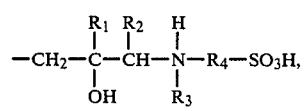

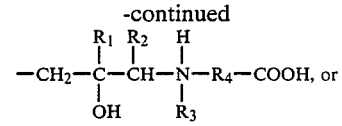

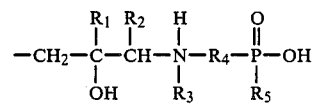

Similarly, the epoxide group may be reacted first with an aminoalcohol such as N-methylethanolamine or diethanolamine to open the oxirane ring and then with a dibasic carboxylic acid anhydride for acylating the resulting terminal hydroxy group. This method also introduces a free carboxylic function to the terminal of the resin backbone.

A still further approach for introducing the anionic hydrophilic group to the terminal of the resin backbone comprises the steps of ring opening the terminal epoxide group by the reaction with water, an aminoalcohol, mono- or dihydroxy monocarboxylic acid, diol or diamine, and then reacting the resulting terminal hydroxy or amino group with a half blocked diisocyanate compound having a free or esterified carboxy group, followed by hydrolysis if necessary.

Examples of ring opening agents which introduce a terminal hydroxy group include water; aminoalcohols such as N-methylethanolamine or diethanolamine; mono- or dihydroxy monocarboxylic acids such as glycolic, lactic, hydroxypivalic or dimethylolpropionic acid; and diols such as ethylene glycol, trimethylene glycol, tetramethylene glycol, 1,6-hexanediol, neopentyl glycol, 1,5-pentanediol, 1,9-nonanediol, 3-methylpentane-1,5-diol, polylactonediol or polyetherdiol. Examples of diamines which introduce a terminal amino group include ethylenediamine, diethylenetriamine or ketimines of these diamines with a suitable ketone. When ketimines are used, the intermediate compounds are subjected to hydrolysis for regenerating free amino groups.

Half blocked diisocyanate compounds having a free carboxy group may be derived from free diisocyanate compounds as hereinbefore described by reacting with a monohydroxy monocarboxylic acid such as glycolic, lactic, hydroxypivalic, 12-hydroxystearic or p-hydroxybenzoic acid. These half blocked diisocyanate compounds may be coupled to the terminal hydroxy or amino group through the remaining free isocyanato group while retaining the free carboxylic function.

Generally, the steps of introducing desired linear side chain blocks and anionic hydrophilic groups into the starting epoxy resin may be performed in any order. However, it is necessary to perform these two steps in one specific order depending upon the nature of particular reactants. For example, when introducing an anionic hydrophilic group using a hydroxycarboxylic acid and a dibasic carboxylic acid anhydride, the starting epoxy resin must be reacted first with the hydroxycarboxylic acid to introduce a primary alcoholic moiety at the terminal followed by acylating this alcoholic group with the dicarboxylic acid anhydride. Thereafter, side chains may be introduced by, for example, addition polymerizing a lactone to a secondary or tertiary alcoholic moiety in the middle of the resin backbone.

Anodic Electrodeposition Coating Composition

The modified epoxy resin produced by the above steps may be stably and uniformly dispersed in an aqueous medium containing a base in an amount sufficient to neutralize at least 20 mol% of the resin.

Examples of bases include ammonia, diethanolamine, triethanolamine, methylethanolamine, diethylamine, N, N-dimethylethanolamine, triethylamine, morphorine and potassium hydroxide.

The aqueous medium is water or a mixture of water and a water-miscible organic solvent such as ethylcellosolve, propylcellosolve, butylcellosolve, ethyleneglycol dimethyl ether, diacetone alcohol, 4-methoxy-4-methylpentanone-2 or methyl ethyl ketone. A small amount of a water-immiscible organic solvent such as xylene, toluene, methyl isobutyl ketone or 2-ethylhexanol may be added to the mixture of water and the water-miscible organic solvent.

The modified epoxy resin may be combined with conventional anionic aqueous acrylic or oxidation-polymerizable resins.

Negatively chargeable aqueous acrylic resins are known as a film-forming component of anodic electrodeposition coating compositions. They have a plurality of acid groups such as carboxy, sulfonic or phosphate group and are capable of dissolving or dispersing in water containing a base.

Anionic acrylic resins are prepared by copolymerizing a monomer mixture containing an acrylate or methacrylate monomer and an ethylenically unsaturated monomer having an acid group. Examples of acrylate or methacrylate monomers include methyl acrylate or methacrylate, ethyl acrylate or methacrylate, butyl acrylate or methacrylate, 2-ethylhexyl acrylate or methacrylate, lauryl acrylate or methacrylate, 2-hydroxyethyl acrylate or methacrylate and glycidyl acrylate or methacrylate.

Examples of monomers having acid group include acrylic acid, methacrylic acid, crotonic acid, itaconic acid, maleic anhydride, sulfoacrylate or (2-hydroxyethyl acrylate) acid phosphate.

The monomer mixture may contain other ethylenically unsaturated monomers such as styrene, vinyltoluene, acrylonitrile, acrylamide and vinyl acetate. Commercially available water-soluble acrylic resins such as those sold by Toray Corporation under the trade name of KOTAX WE-804 or WE-832 may be used.

Oxidation-polymerizable resins used in anodic electrodeposition compositions generally have a carbon-to-carbon double bond capable of oxidation polymerization and a negatively chargeable group such as carboxy. Typical examples thereof are maleinized natural or synthetic drying oils, maleinized polybutadiene, dicarboxylic acids, half esters and half amides derived from the above maleinized resins by the reaction with water, alcohol, ammonia, primary or secondary amines.

The electrodeposition coating composition of this invention may further contain a water-insoluble resin having no chargeable or hydrophilic group and/or a cross-linking agent.

Examples of such wate-insoluble resins are epoxy resins, acrylic resins, alkyd or polyester resins, phenol resins, silicone resins or fluorocarbon resins. These resins themselves are not soluble or dispersible in water but capable of self-crosslinking or cross-linking with a cross-linking agent. The resins may comprise an acid component in an amount corresponding to an acid number up to 10.

Examples of cross-linking agents include melamine resins, urea resins, blocked polyisocyanate compounds, esters and polyesters capable of cross-linking through a transesterification reaction.

The relative amount of water-insoluble resins and/or cross-linking agents generally does not exceed 50% by weight of the total resin content on dry basis. Excessive use of these components may result in decreased stability and Coulomb efficiency.

When these water-insoluble resins and/or cross-linking agents are combined with the water-soluble or water-dispersible modified epoxy resin disclosed herein, a core-shell type emulsion is formed in which the water-insoluble resins and/or cross-linking agents are the core component.

The coating composition of this invention preferably has a Coulomb efficiency from 20 to 70 mg/C. If the Coulomb efficiency is lower than the above range, the electrodeposition coating process consumes too much electrical energy and thus becomes less efficient. Conversely, if the Coulomb efficiency is higher than the above range, the deposited film tends to contain fine bubbles and exhibit excessive run when the film is subsequently baked. The Coulomb efficiency may be determined by the weight of electrically deposited resin per unit amount of electricity (Coulomb).

The electrodeposition coating composition of this invention may further contain conventional pigments such as titanium dioxide, ferric oxide, carbon black, aluminum silicate, precipitated barium sulfate, aluminum phosphomolybdate, strontium chromate, basic lead silicate or lead chromate.

The electrodeposition coating composition of this invention may be applied on a conductive substrate by the electrodeposition coating process at a nonvolatile content of 10 to 20% by weight to a dry film thickness of 15 to 30 microns. After applying, the resulting coating film may be cured at ambient or an elevated temperature of 100° C. to 180° C.

The invention is further illustrated by the following examples in which all parts and percents are by weight unless otherwise specified.

PRODUCTION EXAMPLE 1

To a flask equipped with stirring means, thermometer, nitrogen gas duct and reflux condenser were charged 267 parts of an epoxy resin having a number average molecular weight of 5,000 and an epoxy equivalent of 250 prepared by the reaction of bisphenol A with epichlorhydrin, and 270 parts of methyl isobutyl ketone. Then 126 parts of hydroxypivalic acid and 0.394 parts of benzyldimethylamine were added under nitrogen gas current. The solution was gradually heated to 120° C. over 30 minutes and allowed to react until all epoxy function disappeared and an acid number below 1 was reached. Then the mixture was reacted with 244 parts of sulfophthalic anhydride at 90° C. for 90 minutes. Thereafter 278 parts of ε-caprolactone and 0.457 parts of dibutyltin oxide were reacted at 120° C. for 8 hours. After cooling to 50° C., the mixture was reacted with 683 parts of half blocked diisocyanate obtained by reacting isophoronediisocyanate and stearyl alcohol on equimolar basis. Finally, the reaction product was diluted with 130 parts of methyl isobutyl ketone whereupon modified epoxy resin A having a nonvolatile content of 80.5% and an acid number of 77.2 was obtained.

PRODUCTION EXAMPLE 2

To a flask as used in Production Example 1 were charged 368 parts of an epoxy resin having a number average molecular weight of 1,900 and an epoxy equivalent of 950 prepared from bisphenol A and epichlorhydrin, and 190 parts of methyl isobutyl ketone. The mixture was heated to 80° C. under nitrogen gas current. To the mixture were added 73 parts of azelaic acid and 0.441 parts of benzyldimethylamine and the mixture allowed to react while elevating the temperature to 120° C. over 30 minutes until all epoxy function disappeared and an acid number 51 was reached. Then the mixture was reacted with 873 parts of $\epsilon$-caprolactone and 0.655 parts of tetrapropoxytitanium at 120° C. for 8 hours. After cooling to 50° C., the mixture was reacted with 245 parts of half blocked isophoronediisocyanate with stearyl alcohol until no isocyanato absorption was shown in IR spectrometry. Finally, the product was diluted with 210 parts of methyl isobutyl ketone whereupon modified epoxy resin B having a nonvolatile content of 80.7% and an acid number of 11.7 was obtained.

PRODUCTION EXAMPLE 3

To a flask as used in Production Example 1 were charged 586 parts of bisphenol A-epichlorhydrine epoxy resin having a number average molecular weight of 3,800 and an epoxy equivalent of 1,920, and 310 parts of methyl isobutyl ketone. Then 41 parts of dimethylolpropionic acid and 0.627 parts of benzyldimethylamine were reacted under nitrogen gas current while elevating the temperature to 120° C. over 30 minutes until all epoxy function disappeared and an acid number below 1 was reached. After cooling, the mixture was reacted with 94 parts of hexahydrophthalic anhydride at 100° C. for 90 minutes. Then 879 parts of $\epsilon$-caprolactone and 0.812 parts of dibutyltin oxide were reacted at 120° C. for 8 hours. Finally, the reaction product was diluted with 90 parts of methyl isobutyl ketone whereupon modified epoxy resin C having a nonvolatile content of 80.2% and an acid number of 22.5 was obtained.

PRODUCTION EXAMPLE 4

To a flask as used in Production Example 1 were charged 946 parts of bisphenol A-epichlorhydrine epoxy resin having a number average molecular weight of 10,000 and an epoxy equivalent of 5,000, and 440 parts of methyl isobutyl ketone. Then 25 parts of dimethylolpropionic acid and 0.971 parts of benzyldimethylamine were reacted under nitrogen gas current while elevating the temperature to 120° C. over 30 minutes until all epoxy function disappeared and an acid number below 1 was reached. After cooling, the mixture was reacted with 58 parts of hexahydrophthalic anhydride at 100° C. for 90 minutes. Then 170 parts of $\epsilon$-caprolactone and 0.508 parts of dibutyltin oxide were reacted at 120° C. for 8 hours. Finally, the reaction product was diluted with 360 parts of methyl isobutyl ketone whereupon modified epoxy resin D having a nonvolatile content of 60.7% and an acid number of 20.5 was obtained.

PRODUCTION EXAMPLE 5

To a flask as used in Production Example 1 were charged 456 parts of the epoxy resin used in Production Example 2 and 283 parts of methyl isobutyl ketone. Then 64 parts of dimethylolpropionic acid and 0.52 parts of benzyldimethylamine were reacted under nitrogen gas current while elevating temperature to 120° C. over 30 minutes until all epoxy function disappeared and an acid number below 1 was reached. After cooling, the mixture was reacted with 142 parts of phthalic anhydride at 100° C. for 90 minutes. Then 720 parts of $\delta$-valerolactone and 0.69 parts of tetrapropoxytitanium were reacted at 120° C. for 12 hours. Then 219 parts of half blocked toluylenediisocyanated half with 2-ethylhexanol were reacted until no isocyanato absorption was shown in IR spectrometry. Finally, the reaction product was diluted with 117 parts of methyl isobutyl ketone whereupon modified epoxy resin E having a nonvolatile content of 80.1% and an acid number of 34.5 was obtained.

PRODUCTION EXAMPLE 6

To a flask as used in Production Example 1 were charged 275 parts of bisphenol A-epichlorhydrine epoxy resin having a number average molecular weight of 3,800 and an epoxy equivalent of 190, and 210 parts of methyl isobutyl ketone. Then 71 parts of adipic acid and 0.403 parts of benzyldimethylamine were reacted under nitrogen gas current at 120° C. until an epoxy number of 716 and an acid number below 1 were reached. Then 57 parts of hydroxypivalic acid were similarly reacted until no epoxy function was shown and an acid number below 1 was reached. After cooling, the mixture was reacted with 93 parts of trimellitic anhydride at 100° C. for 90 minutes. Then 580 parts of $\epsilon$-caprolactone and 0.537 parts of tetrapropoxytitanium were reacted at 120° C. for 6 hours. The mixture was further reacted with 255 parts of half blocked isophoronediisocyanate with 2-ethylhexanol. Finally, the reaction product was diluted with 190 parts of methyl isobutyl ketone whereupon modified epoxy resin having a nonvolatile content of 80.8% and an acid number 35.0 was obtained.

PRODUCTION EXAMPLE 7

To a flask as used in Production Example 1 were charged 338 parts of EPIKRON 830 (bisphenol F epoxy resin sold by Dainippon Ink And Chemicals, Inc.) having an epoxy equivalent of 180 and 270 parts of methyl isobutyl ketone. Then 117 parts of azelaic acid and 0.455 parts of benzyldimethylamine were added and the mixture allowed to react at 120° C. until an epoxy equivalent of 728 and an acid number below 1 were reached. The mixture was further reacted with 74 parts of hydroxypivalic acid until no epoxy function was shown, followed by reacting with 96 parts of hexahydrophthalic acid at 100° C. for 90 minutes. To the reaction mixture were added 11.2 parts of potassium hydroxide and 375 parts of propylene oxide in 730 parts of toluene and allowed to react at 60° C. for 18 hours. Finally, the reaction product was diluted with 730 parts of methyl isobutyl ketone to a non-volatile content of 50.1% whereupon modified epoxy resin G having an acid number of 36.1 was obtained.

PRODUCTION EXAMPLE 8

To a flask as used in Production Example 1 were charged 246 parts of DENAKOL EX-810 (polyether type epoxy resin sold by Nagase Sangyo Co., Ltd.) having an epoxy equivalent of 112, 200 parts of adipic acid, 0.45 parts of benzyldimethylamine and 50 parts of methyl isobutyl ketone. The mixture was allowed to react at 120° C. under nitrogen gas current until an acid number of 69 was obtained. After cooling, the intermediate product was reacted with 188 parts of $\epsilon$-caprolactone in the presence of 0.316 parts of dibutyltin oxide at 120° C. for 8 hours and then with 965 parts of half blocked toluylenediisocyanate with PTMG-1000 (polytetramethylene glycol, Mitsubishi Chemical Industries Ltd.) until no isocyanato absorption was shown in IR spectrometry. The reaction product was diluted with 350 parts of methyl isobutyl ketone whereupon modified epoxy resin H having an acid number of 20.2 and a nonvolatile content of 80.0% was obtained.

PRODUCTION EXAMPLE 9

To a similar flask were charged 125 parts of the epoxy resin used in Production Example 1, 400 parts of methyl isobutyl ketone and 49 parts of phosphoric acid. The mixture was allowed to react at 25° C. under nitrogen gas current for 4 hours. Then 1,430 parts of ε-caprolactone were reacted at 120° C. for 8 hours in the presence of 0.71 parts of dibutyltin oxide whereupon modified epoxy resin I having a nonvolatile content of 80.9% and an acid number of 36.0 was obtained.

PRODUCTION EXAMPLE 10

To a flask as used in Production Example 1 were charged 350 parts of the same epoxy resin as used in Production Example 2, 212 parts of methyl isobutyl ketone, 22 parts of hydroxypivalic acid and 0.4 parts of benzyldimethylamine. The mixture was allowed to react at 120° C. under nitrogen gas current until no epoxy function was detected and an acid number below 1 was reached. Then 1,105 parts of ε-caprolactone were reacted at 120° C. for 8 hours in the presence of 0.8 parts of tetrapropoxytitanium. The reaction product was diluted with 188 parts of methyl isobutyl ketone to a nonvolatile content of 80.2% whereupon modified epoxy resin J having an acid number of 33.0 was obtained.

PRODUCTION EXAMPLE 11

To a flask as used in Production Example 1 were charged 287 parts of bisphenol A epoxy resin having a number average molecular weight of 500 and an epoxy equivalent 250, 270 parts of methyl isobutyl ketone and 86 parts of N-methyl-ethanolamine. The mixture was allowed to react under nitrogen gas current at 80° C. until no epoxy function was shown. The mixture was reacted with 262 parts of sulfophthalic anhydride at 80° C. for 90 minutes and then with 300 parts of ε-caprolactone at 120° C. for 8 hours in the presence of 0.467 parts of dibutyltin oxide. Thereafter, the mixture was reacted with 663 parts of half blocked toluylenediisocyanate with stearyl alcohol at 50° C. until no isocyanato absorption was shown in IR spectrometry. The reaction product was diluted with 130 parts of methyl isobutyl ketone to a non-volatile content of 80.5% whereupon modified epoxy resin K having an acid number of 80.9 was obtained.

PRODUCTION EXAMPLE 12

To a flask were charged 367 parts of bisphenol A epoxy resin having a number average molecular weight of 1,900 and an epoxy equivalent of 950, 225 parts of methyl isobutyl ketone and 41 parts of diethanolamine. The mixture was allowed to react under nitrogen gas current at 80° C. until no epoxy function was detected. The mixture was reacted with 119 parts of hexahydrophthalic anhydride at 100° C. for 2 hours and then with 580 parts of ε-caprolactone at 120° C. for 8 hours in the presence of 0.553 parts of tetraisopropoxytitanium. The reaction product was further reacted with 204 parts of half blocked isophoronediisocyanate with 2-ethylhexanol until no isocyanato absorption was shown in IR spectrometry. The reaction product was diluted with 175 parts of methyl isobutyl ketone to a nonvolatile content of 80.2% whereupon modified epoxy resin L having an acid number of 27.2 was obtained.

PRODUCTION EXAMPLE 13

To a flask as used in the preceding examples were charged 520 parts of the epoxy resin used in Production Example 11, 289 parts of methyl isobutyl ketone and 154 parts of N-methylethanolamine. The mixture was allowed to react under nitrogen gas current at 80° C. until no epoxy function was detected. The mixture was reacted with 1,087 parts of 12-hydroxy stearic acid-half blocked isophoronediisocyanate at 60° C. until no isocyanato absorption was shown in IR spectrometry and then with 238 parts of ε-caprolactone at 120° C. for 8 hours in the presence of 1.0 part of dibutyltin oxide. The reaction product was diluted with methyl isobutyl ketone to a nonvolatile content of 50.2% whereupon modified epoxy resin M having acid number of 57.2 was obtained.

PRODUCTION EXAMPLE 14

To a flask as used in the preceding examples were charged 730 parts of the epoxy resin used in Production Example 2, 347 parts of methyl isobutyl ketone and 81 parts of diethanolamine. The mixture was allowed to react under nitrogen gas current at 80° C. until no epoxy function was detected and further with 522 parts of hydroxypivalic acid-half blocked isophoronediisocyanate at 60° C. until no isocyanato absorption was shown in IR spectrometry. Thereafter the mixture was reacted with 307 parts of ε-caprolactone at 120° C. for 8 hours in the presence of 1.0 part of tetraisopropoxytitanium and further with 541 parts of isophoronediisocyanate/2-ethylhexanol half blocked product until no isocyanato absorption was shown in IR spectrometry. The reaction product was diluted with 494 parts of methyl isobutyl ketone to a nonvolatile content of 50.8% whereupon modified epoxy resin N having an acid number of 42.0 was obtained.

PRODUCTION EXAMPLE 15

To a flask as used in the preceding examples were charged 236 parts of the epoxy resin used in Production Example 6, 236 parts of methyl isobutyl ketone, 90.6 parts of adipic acid and 0.16 parts of benzyldimethylamine. The mixture was allowed to react under nitrogen gas current at 120° C. until an epoxy equivalent of 263 and an acid number below 1 were reached. Thereafter the mixture was reacted with 130 parts of N-methylethanolamine at 80° C. until no epoxy function was detected, and further with 370 parts of isophoronediisocyanate/glycolic acid half blocked product until no isocyanato absorption was shown by IR spectrometry. The product was further reacted with 621 parts of δ-valerolacton at 120° C. for 10 hours in the presence of 1.0 part of tributyltin oxide and with 552 parts of toluylenediisocyanate/stearyl half blocked product until no isocyanato absorption was shown by IR spectrometry. Finally, the reaction product was diluted with 524 parts of methyl isobutyl ketone to a nonvolatile content of 51.0% whereupon modified epoxy resin O having an acid number of 34.8 was obtained.

PRODUCTION EXAMPLE 16

To a flask as used in the preceding examples were charged 257 parts of the epoxy resin used in Production Example 1, 162 parts of methyl isobutyl ketone, 121 parts of hydroxypivalic acid and 0.33 parts of benzyldimethylamine. The mixture was allowed to react under nitrogen gas current at 120° C. for 30 minutes until no epoxy function was detected and an acid number below 1 was reached. The mixture was reacted with 321 parts of toluylenediisocyanate/p-hydroxybenzoic acid half blocked product at 60° C. until no isocyanato absorption was shown by IR spectrometry, and further with 843 parts of ε-caprolactone at 120° C. for 8 hours in the presence of 1.0 part of dibutyltin oxide. After cooling to 50° C., the mixture was reacted with 457 parts of isophoronediisocyanate/stearyl alcohol-half blocked product until no isocyanato function was detected by IR spectrometry. The reaction product was diluted with 671 parts of methyl isobutyl ketone to a nonvolatile content of 50.4% whereupon modified epoxy resin P having an acid number of 28.0 was obtained.

PRODUCTION EXAMPLE 17

To a flask as used in the preceding examples were charged 974 parts of the epoxy resin used in Production Example 3, 447 parts of methyl isobutyl ketone, 68 parts of dimethylolpropionic acid and 0.52 parts of benzyldimethylamine. The mixture was allowed to react at 120° C. until no epoxy function was detected and an acid number below 1 was reached. Then the mixture was reacted with 535 parts of isophoronediisocyanate/12-hydroxystearic acid half blocked product at 60° C. until no isocyanato function was detected by IR spectrometry and further with 421 parts of ε-caprolactone at 120° C. for 8 hours in the presence of 1.0 part of dibutyltin oxide. The reaction product was diluted with methyl isobutyl ketone to a nonvolatile content of 51.3% whereupon modified epoxy resin Q having an acid number of 28.8 was obtained.

PRODUCTION EXAMPLE 18

To a flask as used in the preceding examples were charged 1,348 parts of the epoxy resin used in the Production Example 4, 590 parts of methyl isobutyl ketone and 28 parts of diethanolamine. The mixture was allowed to react under nitrogen gas current at 120° C. until no epoxy function was detected. Thereafter the mixture was reacted with 183 parts of hydroxpivalic acid-half blocked isophoronediisocyanate until no isocyanato function was detected by IR spectrometry and further with 108 parts of ε-caprolactone at 120° C. for 8 hours in the presence of 1.0 part of dibutyltin oxide. After cooling to 50° C., the mixture was reacted with 332 parts of 2-ethylhexanol-half blocked isophoronediisocyanate until no isocyanate function was detected by IR spectrometry. The reaction product was diluted with 637.5 parts of methyl isobutyl ketone to a nonvolatile content of 40.6% whereupon modified epoxy resin R having an acid number of 66.5 was obtained.

PRODUCTION EXAMPLL 19

To a flask as used in Production Example 1 were charged 297 parts of the epoxy resin used in Production Example 13, 297 parts of methyl isobutyl ketone, 70 parts of 1,6-hexanediol and 1.0 part of benzyldimethylamine. The mixture was allowed to react under nitrogen gas current at 150° C. until an epoxy equivalent of 309 was reached. Thereafter, the mixture was reacted with 1,238 parts of 12-hydroxystearic acid-half blocked isophoronediisocyanate at 60° C. until no isocyanate function was detected by IR spectrometry, and with 270 parts of ε-caprolactone at 120° C. for 8 hours in the presence of 1.0 part of dibutyltin oxide to obtain modified epoxy resin S having a nonvolatile content of 40.6% and an acid number of 66.5.

PRODUCTION EXAMPLE 20

To a flask as used in the preceding examples were charged 480 parts of a bisphenol A-epichlorhydrine epoxy resin having a number average molecular weight and an epoxy equivalent of 475, 300 parts of methyl isobutyl ketone, and 231 parts of diethylenetriamine-MIBK condensate. The mixture was allowed to react under nitrogen gas current at 130° C. until no epoxy function was detected. The reaction product was hydrolyzed with 70 parts of water to regenerate free amino function. Then the product was reacted with 688 parts of isophoronediisocyanate/hydroxypivalic acid-half blocked product at 80° C. until no isocyanato function was detected by IR spectrometry and further with 230 parts of ε-caprolactone at 120° C. for 4 hours in the presence of 0.3 parts of dibutyltin oxide. Finally, the reaction product was diluted with methyl isobutyl ketone to a nonvolatile content of 70.2% to obtain modified epoxy resin T having an acid number of 67.0.

PRODUCTION EXAMPLE 21

To a flask as used in the preceding examples were charged 416 parts of the epoxy resin used in Production Example 20, 300 parts of methyl isobutyl ketone and 200 parts of diethylenetriamine-MIBK condenste. The mixture was allowed to react under nitrogen gas current at 130° C. until no epoxy function was detected. The reaction product was hydrolyzed with 72 parts of water and then reacted with 915 parts of isophoronediisocyanate/12-hydroxystearic acid-half blocked product at 80° C. until no isocyanato function was detected by IR spectrometry. Then the product was reacted with 200 parts of ε-caprolactone at 120° C. for 4 hours in the presence of 3.0 parts of dibutyltin oxide. Finally the reaction product was diluted with 1,264 parts of methyl isobutyl ketone whereupon modified epoxy resin U having an acid number 61.0 was obtained.

PRODUCTION EXAMPLE 22

To a flask as used in the preceding examples were charged 238 parts of the epoxy resin used in Production Example 20, 150 parts of methyl isobutyl ketone and 114 parts of diethylene triamine-MIBK condensate. The mixture was allowed to react under nitrogen gas current at 130° C. until no epoxy function was detected. After being hydrolyzed with 72 parts of water, the product was reacted with 327 parts of isophoronediisocyanate/ethyl glycolate-half blocked product until no isocyanate function was detected. The reaction product was then hydrolyzed with a mixture of 101 parts of triethylamine and 600 parts of water and then acidified with HCl. After removing aqueous phase, the reaction product was reacted with 50 parts of ε-caprolactone at 120° C. for 5 hours in the presence of 0.3 parts of dibutyltin oxide. The product was finally diluted with methyl isobutyl ketone to a nonvolatile content of 70% whereupon modified epoxy resin V having an acid number of 70.2 was obtained.

PREPARATION OF CONTROL RESINS

PRODUCTION EXAMPLE 23

Similar to Production Example 1, 671 parts of the same epoxy resin in 400 parts of MIBK were reacted with 263 parts of hydroxypivalic acid in the presence of 0.987 parts of benzyldimethylamine and then with 612 parts of sulfophthalic anhydride. Modified epoxy resin C-I having a non-volatile content of 80.7 and an acid number of 50.4 was obtained.

PRODUCTION EXAMPLE 24

Similar to Production Example 2, 1,335 parts of the same epoxy resin in 400 parts of MIBK were reacted with 264 parts of azelaic acid in the presence of 1.598 parts of benzyldimethylamine. Modified epoxy resin C-II having a nonvolatile content of 80.2 and an acid number of 56.8 was obtained.

PRODUCTION EXAMPLE 25

Similar to Production Example 3, 1,220 parts of the same epoxy resin in 400 parts of MIBK were reacted with 85 parts of dimethylolpropionic acid in the presence of 1.306 parts benzyldimethylamine and then with 294 parts of hexahydrophthalic anhydride. Modified epoxy resin C-III having a nonvolatile content of 80.1 and an acid number of 40.5 was obtained.

PRODUCTION EXAMPLE 26

Similar to Production Example 4, 1,074 parts of the same epoxy resin in 340 parts of MIBK were reacted with 75 parts of dimethylolpropionic acid in the presence of 1.35 parts of benzyldimethylamine and 167 parts of hexahydrophthalic anhydride. The product was diluted with 60 parts of MIBK to a nonvolatile content of 80.3% to obtain modified epoxy resin C-IV having an acid number 188.

PRODUCTION EXAMPLE 27

Similar to Production Example 5, 723 parts of the same epoxy resin in 400 parts of MIBK were reacted with 217 parts of N-methylethanolamine and 659 parts of sulfophthalic anhydride to obtain modified epoxy resin C-V having a nonvolatile content of 80.4 and an acid number of 202.

PRODUCTION EXAMPLE 28

Similar to Production Example 6, 1,115 parts of the same epoxy resin in 400 parts of MIBK were reacted with 123 parts of diethanolamine and 362 parts of hexahydrophthalic anhydride to obtain modified epoxy resin C-VI having a nonvolatile content of 80.2% and an acid number of 83.

PRODUCTION EXAMPLE 29

Similar to Production Example 13, 1,059 parts of the same epoxy resin in 588 parts of MIBK were reacted with 314 parts of N-methylethanolamine and 627 parts of phthalic anhydride. The product was diluted with 268 parts of MIBK to a nonvolatile content of 70% to obtain modified epoxy resin C-VII having an acid number of 118.8.

PRODUCTION EXAMPLE 30

Similar to Production Example 14, 1,394 parts of the same epoxy resin in 1,916 parts of MIBK were reacted with 154 parts of hydroxypivalic acid and 451.9 parts of hexahydropthalic anhydride. The product was diluted with 559 parts of MIBK to a nonvolatile content of 72% to obtain modified epoxy resin C-VIII having an acid number of 82.8.

PRODUCTION EXAMPLE 31

Similar to Production Example 14, 1,020 parts of the same epoxy resin in 627 parts of MIBK were reacted with 113 parts of diethanolamine and 330 parts of hexahydrophthalic acid. The product was diluted with 230 parts of MIBK to a nonvolatile content of 70% to obtain modified epoxy resin C-IX having an acid number of 60.2.

PRODUCTION EXAMPLE 32

Similar to Production Example 16, 736 parts of the same epoxy resin in 464 parts of MIBK were reacted with 347 parts of hydroxypivalic acid and 918 parts of toluylenediisocyanate/p-hydroxybenzoic acid-half blocked product. The reaction mixture was diluted with 159 parts of MIBK to a nonvolatile content of 50.2 to obtain modified epoxy resin C-X having an acid number of 82.5.

PRODUCTION EXAMPLE 33

Similar to Production Example 19, 574 parts of the same epoxy resin in 318 parts of MIBK were reacted with 170 parts of N-methylethanolamine, 1,199 parts of isophoronediisocyanate/12-hydroxystearic acid-half blocked compound. The product was then reacted with 57 parts of δ-valerolactone in the presence of 1.0 part of dibutyltin oxide and diluted with 538.2 parts of MIBK to a nonvolatile content of 48.9%. Modified epoxy resin C-XI having an acid number of 64.6 was obtained.

Some properties of resin A through V and C-I through C-XI are shown in Table I.

TABLE I

| | A | B | C | D | E | F | G | H | I | J | K | L | M | N | O | P | Q | R |
|---|---|---|---|---|---|---|---|---|---|---|---|---|---|---|---|---|---|---|
| Hydroxyl Number | 2.6 | 7.5 | 14.4 | 36.0 | 7.5 | 6.0 | 6.0 | 8.0 | 2.6 | 7.5 | 2.6 | 7.5 | 4.1 | 7.5 | 2.0 | 4.1 | 14.4 | 36.0 |
| Acid Number | 77.2 | 11.7 | 22.5 | 20.5 | 34.5 | 35.0 | 36.1 | 20.2 | 36.0 | 33.0 | 80.9 | 27.2 | 57.5 | 42.0 | 34.8 | 28.0 | 28.8 | 15.12 |
| Nonvolatile Content, % | 80.5 | 80.7 | 80.2 | 60.7 | 80.1 | 80.8 | 50.1 | 80.0 | 80.9 | 80.2 | 80.5 | 80.2 | 50.2 | 50.8 | 51.0 | 50.4 | 51.3 | 51.1 |
| Mn—S/Mn—B* | 1.509 | 2.625 | 1.219 | 0.175 | 1.417 | 1.684 | 0.6 | 2.586 | 8.48 | 2.230 | 1.513 | 1.487 | 0.14 | 0.74 | 1.42 | 1.88 | 0.27 | 0.28 |

| | S | T | U | V | C-I | C-II | C-III | C-IV | C-V | C-VI | C-VII | C-VIII | C-IX | C-X | C-XI |
|---|---|---|---|---|---|---|---|---|---|---|---|---|---|---|---|
| Hydroxyl Number | 4.1 | 4.1 | 4.1 | 4.1 | 7.5 | 14.4 | 15.0 | 2.6 | 2.6 | 7.5 | 4.1 | | 14.4 | 14.4 | 4.1 | 4.1 |
| Acid Number | 66.5 | 67.0 | 61.0 | 70.2 | 50.4 | 56.8 | 40.5 | 188 | 20.2 | 83.0 | 118.8 | 82.8 | 60.2 | 82.5 | 64.4 |
| Nonvolatile Content, % | 40.5 | 70.2 | 70.8 | 70.0 | 80.7 | 80.2 | 80.1 | 80.3 | 80.4 | 80.2 | 70.0 | 72.0 | 70.0 | 50.2 | 48.9 |

TABLE I-continued

| Mn—S/Mn—B* | 0.16 | 0.16 | 0.13 | 0.07 |

*Ratio of Mn of side chain blocks/Mn of backbone

EXAMPLE 1

A 70:30 mixture on dry basis of Resin A and methylate melamine resin (Mn=500, nonvolatile content 100%, Nippon Paint Co., Ltd.) was dissolved in deionized water containing an amount of triethylamine sufficient to neutralize 50% of Resin A at a dry content of 15%.

The resulting composition was electrically deposited on a zinc phosphate-treated steel plate used as anode at 150 V for 3 minutes at 30° C. The coated plate was then rinsed with water and baked at 150° C. for 30 minutes to give a cured film having a thickness of about 25 microns. The resulting film was tested for its properties.

EXAMPLE 2

Example 1 was followed except that resin B was replaced for Resin A and mixed with methylated melamine resin in a proportion of 80:20 on dry basis.

EXAMPLE 3

80 parts on dry basis of Resin C and 20 parts of toluylenediisocyanate/2-ethylhexanol fully blocked compound were dissolved at a dry content of 15% in deionized water containing an amount of triethylamine sufficient to neutralize 50% of Resin C and 0.2 parts of dibutyltin oxide.

The resulting composition was electrically deposited under the same conditions and baked at 170° C. for 30 minutes.

EXAMPLES 4 through 7

Example 1 was followed except that Resin A was replaced by Resins D through G, respectively.

EXAMPLES 8 through 10

Example 3 was followed except that Resin C was replcaed by Resins H through J, respectively.

EXAMPLE 11

Example 2 was followed except that 30% of Resin B was neutralized with triethylamine.

EXAMPLE 12

40 parts on dry basis of Resin B, 20 parts on dry basis of methylated melamine resin and 40 parts on dry basis of a water insoluble resin (Mn=2,000, OH number 80, acid number 0, nonvolatile content 40%, Nippon Paint Co., Ltd.) were dissolved at a dry content of 15% in deionized water containing an amount of triethylamine sufficient to neutralized 80% of Resin B.

The resulting composition was electrically deposited and baked as in Example 1 under the same conditions.

EXAMPLE 13

Example 3 was followed except that Resin K was replaced for Resin C.

EXAMPLE 14

Example 1 was followed except that Resin L was replaced for Resin A.

COMPARATIVE EXAMPLES 1 THROUGH 3

Examples 1-3 were followed except that Resins A through C were replaced by Resins C-I through C-III, respectively.

COMPARATIVE EXAMPLE 4

Example 1 was followed except that Resin C-IV was replaced for Resin A.

COMPARATIVE EXAMPLE 5

Example 3 was followed except that Resin C-V was replaced for Resin C.

COMPARATIVE EXAMPLE 6

Example 1 was followed except that Resin C-VI was replaced for Resin A.

Properties of the films obtained in the preceding examples are shown in Table II.

TABLE II

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Coulomb[1] Efficiency (mg/C) | 28 | 68 | 50 | 36 | 30 | 38 | 32 | 55 | 40 | 35 | 40 | 34 | 40 | 33 |
| Pencil[2] Hardness | F | F-H | F-H | H | F-H | F | F | HB | B | F | F-H | 2H | H | H |
| Adhesion[3] property | ⊙ | ⊙ | ⊙ | ⊙ | ⊙ | ⊙ | ⊙ | ⊙ | ⊙ | ⊙ | ⊙ | ⊙ | ⊙ | ⊙ |
| Impact[4] Strength (500 g, cm) | 50 | 50 | 40 | 50 | 50 | 50 | 50 | 40 | 50 | 50 | 50 | 50 | 50 | 50 |
| Corrosion[5] Resistance | ⊙ | ⊙ | ⊙ | ⊙ | ⊙ | ⊙ | ⊙ | ⊙ | ⊙ | ⊙ | ⊙ | ⊙ | ⊙ | ⊙ |
| Smoothness[6] | ⊙ | ⊙ | ⊙ | ⊙ | ⊙ | ⊙ | ⊙ | ⊙ | ⊙ | ⊙ | ⊙ | ⊙ | ⊙ | ⊙ |

| | Comparative Examples | | | | | |
|---|---|---|---|---|---|---|
| | 1 | 2 | 3 | 4 | 5 | 6 |
| Coulomb[1] Efficiency (mg/C) | >20 | >20 | >20 | >20 | >20 | >20 |
| Pencil[2] Hardness | H-2H | H | 2H | F | 2H | H |

TABLE II-continued

|  |  |  |  |  |  |  |
|---|---|---|---|---|---|---|
| Adhesion[3] Strength | Δ | Δ | Δ | Δ | Δ | Δ |
| Impact[4] strength (500 g, cm) | 20 | 15 | 10 | 30 | 10 | 15 |
| Corrosion[5] Resistance | Δ | Δ | Δ | Δ | Δ | Δ |
| Smoothness[6] | x | Δ | x | Δ | x | Δ |

Remarks
[1] Weight of cured film (mg) divided by the amount electricity (Coulomb).
[2] Pencils of MITSUBISHI UNI series were used.
[3] Crosscut tape test. The coated film was crosscut into 100 square sections of 1 mm × 1 mm. A cellophan adhesive tape applied on the cut surface was rapidly peeled off. The number of remaining sections was counted.
⊚ >90; Δ 70-90; x <70
[4] Du Pont impact strength tester was used. The maximum limit of dropping distance (cm) of a ball (500 g, ½ inch diameter) which does not damage the film.
[5] Salt spray test. A 5% saline was sprayed for 200 hours. Evaluation was made by the width of rust developed from the cut edge according to the following schedule:
⊚ no rust; Δ <2 mm; x >2 mm
A polished cold milled steel plate was used as a substrate.
[6] Visually determined according to the following schedule:
⊚ very good; Δ fair; x bad

EXAMPLES 15 and 16

Example 1 was followed except that Resin M or N was replaced for Resin A.
Also the composition was tested for surface active properties.

EXAMPLE 17

Example 2 was followed except that Resin O was replaced for Resin B.

EXAMPLE 18

Example 2 was followed except that Resin P was replaced for Resin B and the amount of triethylamine was increased to 70% neutralization of the resin.

EXAMPLES 19 THROUGH 21

Example 3 was followed except that Resin C was replaced by Resins Q through S, respectively, and the amount of triethylamine was increased to 70% neutralization of the resin.

EXAMPLE 22

Example 3 was followed except that Resin C was replaced by Resin M and the amount of triethylamine was increased to 70% neutralization of the resin.

EXAMPLE 23

Example 12 was followed except that Resin B was replaced by Resin M and the amount of triethylamine was decreased to 50% neutralization of the resin.

EXAMPLES 24 and 25

Example 3 was followed except that Resin C was replaced by Resin T or U.

EXAMPLE 26

Example 2 was followed except Resin V was replaced for Resin B.

COMPARATIVE EXAMPLES 7 THROUGH 9

Example 15 was followed except that Resin M was replaced by Resins C-VII through C-IX, respectively.

COMPARATIVE EXAMPLE 10

Example 18 was followed except that Resin C-X was replaced for Resin P.

COMPARATIVE EXAMPLE 11

Example 8 was followed except that Resin C-XI was replaced for Resin M.

Properties of the compositions and films obtained in the preceding examples are shown in Table III.

TABLE III

|  | Examples | | | | | | | | | | | | Comparative Examples | | | | |
|---|---|---|---|---|---|---|---|---|---|---|---|---|---|---|---|---|---|
|  | 15 | 16 | 17 | 18 | 19 | 20 | 21 | 22 | 23 | 24 | 25 | 26 | 7 | 8 | 9 | 10 | 11 |
| Surface[7] Tension (dyne/cm²) | <50 | <50 | <50 | <50 | <50 | <50 | <50 | <50 | <50 | <50 | <50 | <50 | >50 | >50 | >50 | >50 | >50 |
| Water-[8] Dispersibility | ○ | ○ | ○ | ○ | ○ | ○ | ○ | ○ | ○ | ○ | ○ | ○ | x | x | x | x | x |
| Stability[9] | ○ | ○ | ○ | ○ | ○ | ○ | ○ | ○ | ○ | ○ | ○ | ○ | x | x | x | x | x |
| Coulomb Efficiency | 28 | 30 | 35 | 27 | 40 | 35 | 32 | 30 | 38 | 38 | 42 | 40 | <20 | <20 | <20 | <20 | <20 |
| Pencil Hardness | H | 2H | H | 2H | 2H | 2H | F | H | H | H | H | H | H | 2H | H | H | H |
| Adhesion Property | ⊙ | ⊙ | ⊙ | ⊙ | ⊙ | ⊙ | ⊙ | ⊙ | ⊙ | ⊙ | ⊙ | ⊙ | Δ | Δ | Δ | Δ | Δ |
| Impact Strength (500 g, cm) | 50 | 40 | 50 | 40 | 40 | 40 | 50 | 50 | 40 | 50 | 50 | 50 | 20 | 15 | 10 | 15 | 15 |
| Water[10] Resistance | ○ | ○ | ○ | ○ | ○ | ○ | ○ | ○ | ○ | ○ | ○ | ○ | x | x | x | x | x |
| Corrosion Resistance | ⊙ | ⊙ | ⊙ | ⊙ | ⊙ | ⊙ | ⊙ | ⊙ | ⊙ | ⊙ | ⊙ | ⊙ | Δ | Δ | x | Δ | x |

TABLE III-continued

| | Examples | | | | | | | | | | | | Comparative Examples | | | | |
|---|---|---|---|---|---|---|---|---|---|---|---|---|---|---|---|---|---|
| | 15 | 16 | 17 | 18 | 19 | 20 | 21 | 22 | 23 | 24 | 25 | 26 | 7 | 8 | 9 | 10 | 11 |
| Smoothness | ⊙ | ⊙ | ⊙ | ⊙ | ⊙ | ⊙ | ⊙ | ⊙ | ⊙ | ⊙ | ⊙ | ⊙ | x | x | x | Δ | Δ |

Remarks
[7] Surface tension at 5% concentration measured by a dynometer.
[8] ⊙ good; Δ fair; x not dispersible
[9] Evaluation was made based on the amount of sediments after standing the composition for 1 month.
◯ good; Δ fair; x bad
[10] Evaluation was made visually after immersing in water for 20 days at 40° C.
◯ no change; x occurrence of blister or no gloss

We claim:

1. An anodic electrodeposition coating composition comprising a modified epoxy resin dispersed in an aqueous medium containing a base, said modified epoxy resin being derived from an epoxy resin having an epoxy equivalent from 100 to 6,000 and two epoxide groups and at least one alcoholic hydroxy group at the terminals and the middle of the resin backbone, respectively, said modified epoxy resin having at said middle a side chain block of the formula:

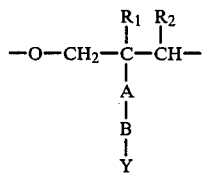

wherein $R_1$ and $R_2$ are independently H or $CH_3$, A is an ether or ester linkage formed from said alcoholic hydroxy group or a bivalent linkage formed by the reaction of a diisocyanate compound with said alcoholic hydroxy group, B is a linear polymer block selected from linear polylactone, polylactam, polyether or polyester chains, and having a molecular weight from 100 to 7,000, and Y is hydroxy, amino, carboxy or a half blocked diisocyanate compound bound to these active hydrogen-containing groups, and at least one acid group derived from said terminal epoxide group.

2. The composition according to claim 1, wherein said acid group is a group of the formula:

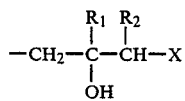

wherein $R_1$ and $R_2$ are as defined, and X is the residue of a polyfunctional carboxylic, sulfonic or phosphoric acid having an active hydrogen-containing group capable of reacting with said epoxide group.

3. The composition of claim 1, wherein said acid group is represented by the formula:

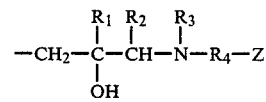

or

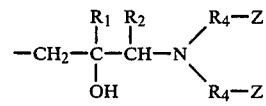

wherein $R_1$ and $R_2$ are as defined, $R_3$ is H, or unsubstituted or substituted $C_1$-$C_{20}$ alkyl, $R_4$ is unsubstituted or substituted $C_1$-$C_{12}$ alkylene or phenylene, optionally interrupted with a ether or ester linkage, and Z is

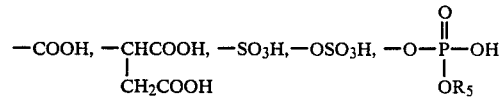

wherein $R_5$ is H, unsubstituted or substituted $C_1$-$C_{12}$ alkyl or phenyl, or partially esterified polybasic organic acid residue.

4. The composition according to claim 1, wherein said acid group is formed by reacting at least one of said terminal epoxide groups with a compound having at least two active hydrogen-containing groups capable of reacting with said epoxide group and with an isocyanato group, and reacting the resulting derivative containing said active hydrogen-containing group at said terminal with a half blocked diisocyanate compound with a hydroxycarboxylic acid.

5. The composition according to claim 1 containing a water-insoluble resin capable of self-crosslinking or crosslinking with a crosslinking agent.

6. The composition according to claim 1 containing a crosslinking agent.

7. The composition according to claim 6, wherein said crosslinking agent is an aminoplast resin or a polyisocyanate compound blocked with a blocking agent capable of unblocking upon heating.

8. The composition according to claim 7, wherein said crosslinking agent is an aminoplast resin or a polyisocyanate compound blocked with a blocking agent capable of unblocking upon heating.

9. The composition according to claim 1 having a Coulomb efficiency from 20 to 70 mg/C.

* * * * *